Figure 1:
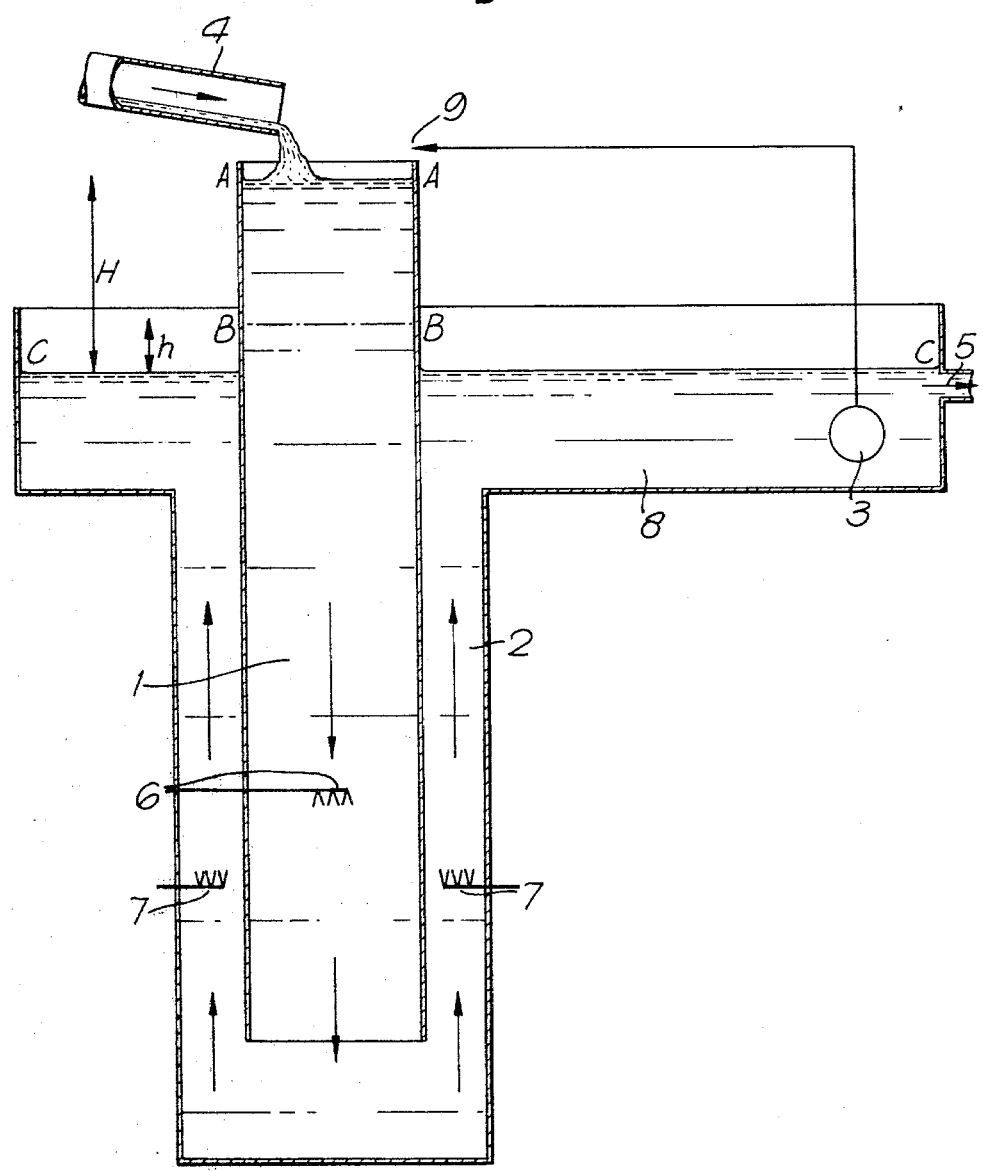

United States Patent [19]

Bolton

[11] 4,338,197

[45] Jul. 6, 1982

[54] METHOD AND APPARATUS FOR THE TREATMENT OF WASTEWATER

[75] Inventor: David H. Bolton, Linthorpe, England

[73] Assignee: Imperial Chemical Industries Limited, London, England

[21] Appl. No.: 246,434

[22] Filed: Mar. 23, 1981

[30] Foreign Application Priority Data

Apr. 3, 1980 [GB] United Kingdom ............... 8011384

[51] Int. Cl.³ .............................................. C02F 3/22
[52] U.S. Cl. ................................. 210/621; 210/629; 210/744; 210/109; 210/194; 210/220
[58] Field of Search ............. 210/621, 622, 629, 744, 210/97, 109, 194, 220, 614

[56] References Cited

U.S. PATENT DOCUMENTS

| | | | |
|---|---|---|---|
| 1,516,132 | 11/1924 | Allen | 210/109 |
| 1,930,006 | 10/1933 | Fox | 210/194 |
| 3,103,488 | 9/1963 | Griffin | 210/625 |
| 3,567,629 | 3/1971 | Ayers | 210/622 |
| 3,642,615 | 2/1972 | Wieferig | 210/622 |
| 3,892,659 | 7/1975 | Kirk | 210/744 |
| 3,979,293 | 9/1976 | Boulenger | 210/220 |
| 4,092,249 | 5/1978 | La Gatta | 210/629 |
| 4,100,071 | 7/1978 | Beurer | 210/220 |
| 4,207,180 | 6/1980 | Chang | 210/629 |
| 4,253,949 | 3/1981 | Hines | 210/194 |
| 4,278,546 | 7/1981 | Roesler | 210/626 |
| 4,297,217 | 10/1981 | Hines et al. | 210/614 |
| 4,304,665 | 12/1981 | Hines | 210/194 |

FOREIGN PATENT DOCUMENTS

| | | |
|---|---|---|
| 104280 | 3/1974 | German Democratic Rep. . |
| 1025771 | 4/1966 | United Kingdom . |
| 1473665 | 5/1977 | United Kingdom ............... 210/629 |

OTHER PUBLICATIONS

"Breakthrough in Sewage Treatment", Water Services, Apr. 1975, 132, 140.

Primary Examiner—Ernest G. Therkorn
Attorney, Agent, or Firm—Cushman, Darby & Cushman

[57] ABSTRACT

This invention provides a method for treating wastewater by circulating wastewater around a system comprising a downcomer and a riser which communicate directly at their lower ends, the level of the wastewater in the downcomer being maintained above the level of the wastewater in the riser to provide a hydrostatic pressure head which causes circulation of the wastewater around the system, supplying a gas containing oxygen to the wastewater as it passes through the downcomer, pumping the wastewater from the top of the riser back into the top of the downcomer and removing treated wastewater from the riser at the same rate as wastewater is introduced into the system characterized in that the height of the hydrostatic pressure head is controlled by adjusting the height at which treated wastewater is removed from the riser and the level of the wastewater in the riser. The invention also provides an apparatus for putting the method into practice.

10 Claims, 3 Drawing Figures

METHOD AND APPARATUS FOR THE TREATMENT OF WASTEWATER

This invention relates to a method and apparatus for the treatment of liquid-borne biologically-degradable waste material, hereinafter referred to as wastewater, which term is to be understood to include all types of biologically degradable domestic and industrial waste materials, for example normal domestic sewage, the effluents produced by farms, food factories and other industries producing such waste.

The methods generally employed in the treatment of waste-water comprise essentially a primary treatment by physical methods such as screening and sedimentation to remove large suspended solids followed by a secondary treatment by biological methods to remove organic materials. The present invention relates to a secondary treatment stage.

The present invention relates to a method for the treatment of wastewater which comprises the steps of introducing wastewater into, and circulating it around, a system comprising a downcomer and a riser in direct communication with each other at their lower ends, the level of the wastewater in the downcomer being maintained above the level of the wastewater in the riser to provide a hydrostatic pressure head which causes circulation of the wastewater around the system, supplying a gas containing free oxygen to the wastewater as it passes through the downcomer, pumping the wastewater from, or from near, the top of the riser back into the downcomer at or near the top thereof, and removing treated wastewater from the riser at substantially the same rate as wastewater is introduced into the system characterised in that the height of the hydrostatic pressure is controlled by adjusting the height at which treated wastewater is removed from the riser and, hence, the level of the wastewater in the riser.

The present invention also relates to an apparatus for the treatment of wastewater comprising a downcomer and a riser in direct communication with each other at their lower ends, means for introducing wastewater into the apparatus, means for supplying a gas containing free oxygen to the wastewater as it passes through the downcomer, means for pumping the wastewater from, or from near, the top of the riser back into the downcomer at or near the top thereof to maintain the level of the wastewater in the downcomer above the level of the wastewater in the riser, and at least one outlet for removing treated wastewater from the riser at substantially the same rate as wastewater is introduced into the apparatus, characterised in that means are provided for varying and adjusting the height at which treated wastewater is removed from the riser through the said outlet, whereby the level of the wastewater in the riser and the height of the hydrostatic pressure head can be controlled.

Figure 2:
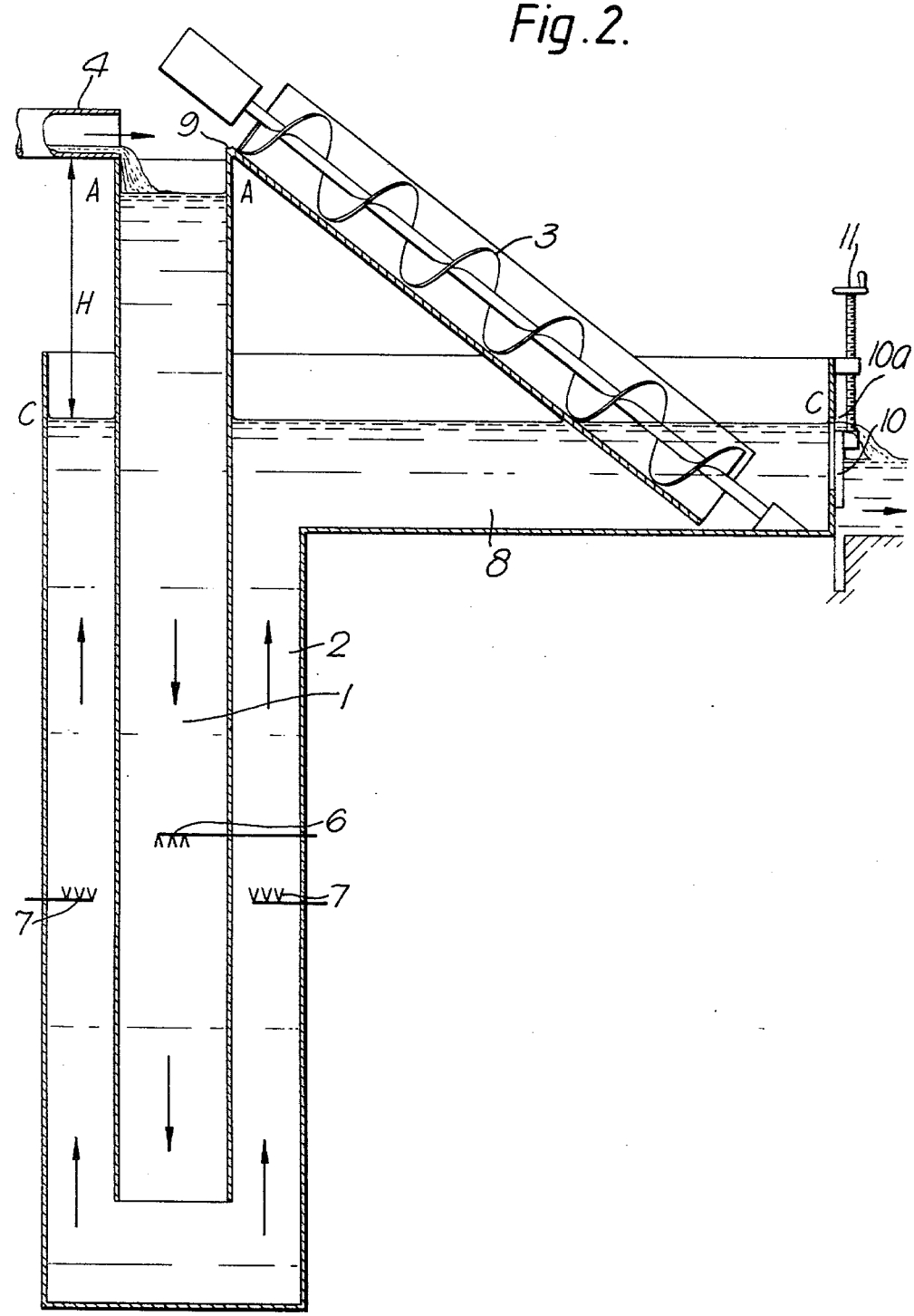
Figure 3:
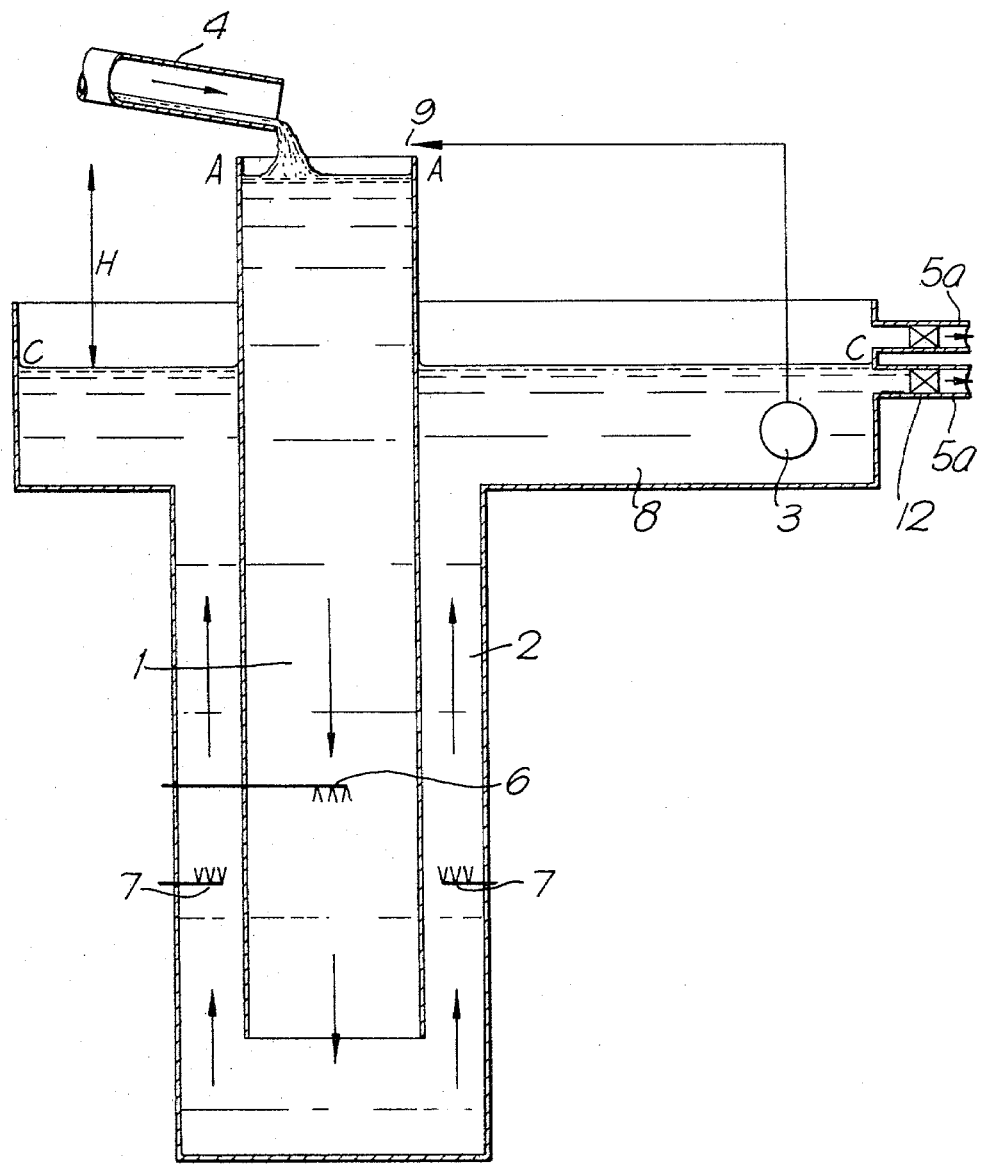

In the accompanying drawings,

FIG. 1 illustrates diagramatically, a known example of the kind of apparatus for the treatment of wastewater suitable for modification and use in the present invention while FIGS. 2 and 3 illustrate, diagramatically, two examples of modifications made thereto in accordance with the invention.

As illustrated in FIG. 1, the apparatus comprises a downcomer 1 and a riser 2 which are in direct communication with each other at their lower ends where they form a closed loop, and a pump 3 which recirculates wastewater from, or from near, the top of the riser 2 back into the downcomer 1 at or near the top thereof. Although the wastewater must be pumped up from the riser to a higher level in the downcomer, in the interests of power economy it is desirable not to pump it to a higher level than that required to achieve the desired rate of circulation around the system. Wastewater to be treated is introduced into the apparatus (preferably into the downcomer 1) at any desired rate at a convenient point 4 and, after being recirculated around the apparatus many times, treated wastewater is removed from the apparatus at substantially the same rate at any convenient point 5.

A gas containing free oxygen (for example air) is introduced into the downcomer 1 at such a rate and at any convenient point 6 such that it is substantially all entrained by the downwardly flowing wastewater. Preferably the gas is introduced into the downcomer 1 at a point between about one-tenth and six-tenths of the length of the downcomer measured from the surface of the wastewater therein. A gas containing free oxygen, for example air, may also be introduced into the riser 2, for example at 7.

The top of the riser 2 constitutes a head tank 8, for example in the form of a basin of enlarged cross-section in which most of the gas bubbles become disengaged from the wastewater and escape to the atmosphere before the wastewater reaches the pump 3. It is stressed that although it is necessary to disengage gas bubbles from the wastewater before it is pumped back into the downcomer, it is not essential to provide a basin of enlarged cross-section for this purpose. If the pump is of a suitable type, e.g. an archimedean screw pump, gas disengagement will occur if the wastewater is pumped directly from the top of the riser 2 back into the downcomer.

The pump 3 may be of any type suitable for pumping the wastewater from the head tank 8 up and back into the downcomer 1 for example at point 9. Examples of suitable pumps are centrifugal pumps, axial flow pumps, and positive displacement pumps, for example archimedean screw pumps. The latter have the added advantage of causing further disengagement of gas bubbles from the wastewater and of not shearing flocs.

In FIG. 1, A—A represents the mean level of the wastewater in the downcomer 1 when the apparatus is operating under the most onerous conditions with which it is designed to cope, with maximum velocity of wastewater around the system and maximum introduction of air into the circulating wastewater. (For a specific constant duty and load, the mean level A—A will remain substantially constant, but there will be natural, short-term oscillations above and below this level; the downcomer 1 extends sufficiently far above the level A—A to ensure that during such short-term oscillations above A—A the wastewater does not overflow from the top of the downcomer). When the mean level in the downcomer is at A—A, the mean level in the head-tank 8 will be, for example, at C—C, and the mean level C—C will remain substantially constant in spite of short-term oscillations in the level A—A. There will therefore be a substantially constant head H causing circulation of the wastewater down the downcomer 1 and up the riser 2 to the head-tank 8, and the pump 3 will use a substantially constant amount of power in pumping the wastewater from the head-tank 8 back into the top of the downcomer at 9 (which, for reasons of economy, should not be located any higher than is necessary to take account of natural, short-term oscillations in the level A—A). This power consumption is unavoidable when the level of the wastewater in the downcomer is maintained substantially constant at A—A.

However, in many (possibly in most) cases, the apparatus will not always be operating under the most onerous conditions with which it is designed to cope, since the nature of the wastewater and the load may vary at regular or irregular intervals. In the case of domestic sewage, for example, there may be considerable differences between the diurnal and nocturnal loads and, indeed, it may be possible to forecast at what hours the changes from heavy duty to light duty (and vice versa) occur daily.

Upon changing to light duty (that is to say, at reduced velocity of wastewater around the system and at reduced introduction of air into the circulating wastewater) the mean level of the wastewater in the downcomer will sink from A—A to (for example) a mean level of B—B (which, as in the case of A—A, will also be subject to natural short-term oscillations). The level C—C in the head-tank 8 will also sink, but to a lesser degree, and if the head tank 8 has a very large cross-section it may, in fact, continue to remain substantially constant at almost its original level. There will now be a smaller but substantially constant head h causing circulation of the wastewater down the downcomer 1 and up the riser 2 to the head-tank 8. The pump 3 continues to pump wastewater from the head-tank 8 back into the downcomer 1 at 9, even though it is only necessary to raise this wastewater to the level B—B, and hence any power consumed by the pump in raising the wastewater from the head-tank 8 to above the level B—B is unfortunately (but unavoidably) wasted when the apparatus is as shown in FIG. 1.

Methods of overcoming this wastage of power are illustrated in FIGS. 2 and 3, in which the pump 3 is shown as an archimedean screw pump. Instead of a single fixed outlet 5 from the head-tank 8, there are provided one or more outlets located at various variable and adjustable heights above the base of the head-tank. In the embodiment illustrated in FIG. 2, this takes the form of an adjustable weir 10 provided adjacent an opening 10a in the wall of the head-tank 8; the wastewater in the head-tank 8 overflows the top of the weir 10 and is removed from the system. If the weir 10 were to cover the opening 10a completely, wastewater could only escape from the head-tank 8, if at all, over the wall of the head-tank which is not desired. However as the weir 10 is lowered, wastewater can escape through the top of the opening 10a, and as the weir 10 continues to be lowered it will escape through the opening 10a at a lower level, until the opening 10a is completely uncovered when the wastewater escapes at the lowest possible level. By lowering or raising the adjustable weir 10, therefore, the level C—C of the wastewater in the head-tank 8 is correspondingly lowered or raised and the head H is increased or decreased to provide the necessary circulation of the wastewater down the downcomer and up the riser to the head-tank 8. For increasingly onerous operating conditions, the adjustable weir 10 is lowered, so as to provide a large head H; for decreasingly onerous operating conditions, the adjustable weir 10 is raised, so as to provide a smaller head H. It will be appreciated that the amount of power consumed by the screw pump 3 will depend upon how many of its turns are located above the level C—C, since those of its turns which are located below C—C are not, in fact, contributing to the raising of the wastewater. As the level C—C sinks, more turns of the screw pump 3 come into operation and more power is consumed; as the level C—C rises, fewer turns of the screw pump 3 are actually contributing to the raising of the wastewater and less power is consumed.

The height of the weir 10 (and hence the level C—C and the head H) may be adjusted on an ad hoc basis as and when it becomes necessary, or it may be adjusted in accordance with a predetermined programme (for example, in the case of a domestic sewage plant, at fixed times at night and in the morning, or at other times when it is known that the load normally decreases or increases). It may be adjusted manually or otherwise by any suitable height-adjusting means, generally designated by 11, for example in response to signals activated by changes in one or more operating parameters of the system, such as the rate of introduction of wastewater into the system at 4, the level A—A, the dissolved oxygen concentration of the wastewater and the rate of introduction of air into the system (which may itself be controlled by the preceding parameters) in such a way that the height of the adjustable weir 10 is increased or decreased as the circumstances require. In the case of the parameters mentioned above, any increase would require a decrease in the height of the adjustable weir 10, and vice versa. There may, of course, be several openings 10a in the wall of the head-tank 8, each with its own adjustable weir 10; preferably, but not necessarily, all the weirs 10 are controlled by a single height-adjusting means 11.

An adjustable weir 10, as described, is only one means of raising and lowering the level C—C of the wastewater in the head-tank 8. As illustrated in FIG. 3, one can, for instance, have an outlet 5 (as shown in FIG. 1) which can be opened or closed by a valve 12 or the like, with a further similar outlet 5a with valve 12a located above it. As long as the outlet 5 is open, the level C—C will remain substantially constant; when the outlet 5 is closed, the level C—C will rise to the upper outlet 5a until the lower outlet 5 is opened again when it will sink back to its original level. There could, of course, be more than two such outlets 5, 5a, to provide finer control of the wastewater level C—C, and the opening and closing of the outlets could be effected manually or otherwise (as described hereinabove in respect of the adjustable weir 10).

Although the invention has been described hereinabove with particular reference to archimedean screw pumps, it will be appreciated that it is equally applicable to other types of pumps.

I claim:

1. In a method for the treatment of wastewater which comprises the steps of introducing wastewater into, and circulating it around, a system comprising a downcomer and a riser in direct communication with each other at their lower ends, the level of the wastewater in the downcomer being maintained above the level of the wastewater in the riser to provide a hydrostatic pressure head which causes circulation of the wastewater around the system, supplying a gas containing free oxygen to the wastewater as it passes through the downcomer, pumping the wastewater from, or from near, the top of the riser back into the downcomer at or near the top thereof, and removing treated wastewater from the riser at substantially the same rate as wastewater is introduced into the system, the improvement which comprises increasing the height at which treated wastewater is removed from the riser thereby increasing the level of wastewater in the riser when operating under conditions that are less onerous than the design conditions in order to provide a reduction in the energy required for pumping the waste water from the riser into the downcomer.

2. A method as claimed in claim 1, wherein the upper end of the riser terminates in a head tank and wastewater is removed from the head tank at a variable and adjustable height.

3. A method as claimed in claim 2, wherein the said height is adjusted manually.

4. A method as claimed in claim 2, wherein the said height is adjusted in response to signals activated by one or more operating parameters of the system.

5. In an apparatus for the treatment of wastewater comprising a downcomer and a riser in direct communication with each other at their lower ends, means for introducing wastewater into the apparatus, means for supplying a gas containing free oxygen to the wastewater as it passes through the downcomer, means for pumping the wastewater from, or from near, the top of the riser back into the downcomer at or near the top thereof to maintain the level of the wastewater in the downcomer above the level of the wastewater in the riser, and at least one outlet for removing treated wastewater from the riser at substantially the same rate as wastewater is introduced into the apparatus, the improvement which comprises means for varying and adjusting the height at which treated wastewater is removed from the riser through the said outlet, whereby the level of the wastewater in the riser can be increased when the apparatus is operating under conditions that are less onerous than the design conditions thereby responsively decreasing the height of the hydrostatic pressure head.

6. An apparatus as claimed in claim 5, wherein at least two outlets are provided one above the other, and the upper end of the riser terminates in a head tank, comprising an opening in the wall of the head tank, the lower of the two outlets being provided with means for opening or closing it, the arrangement being such that when the lower outlet is open treated wastewater flows out of the head tank therethrough, and that when the lower outlet is closed the level of the wastewater in the head tank rises until it flows out of the upper outlet.

7. An apparatus as claimed in claim 5, wherein the upper end of the riser terminates in a head tank and the said outlet comprises an opening in the wall of the head tank which is adapted to be opened or closed to a greater or lesser extent by a vertically adjustable weir or the like, whereby treated wastewater flows from the head tank, through the opening, and over the weir at a height determined by the position of the top of the weir.

8. An apparatus as claimed in claim 7, including at least one further outlet intermediate the lower and upper outlets and being provided with means for opening or closing it.

9. An apparatus as claimed in claim 5, wherein the said means for varying and adjusting the height at which treated wastewater is removed from the riser is operated manually.

10. An apparatus as claimed in claim 5, wherein the said means for varying and adjusting the height at which treated wastewater is removed from the riser operates in response to signals activated by one or more operating parameters of the system.

* * * * *